(12) United States Patent
Snyder

(10) Patent No.: US 7,835,841 B2
(45) Date of Patent: Nov. 16, 2010

(54) METHOD AND APPARATUS TO DETERMINE ROTATIONAL POSITION OF AN INTERNAL COMBUSTION ENGINE

(75) Inventor: Bryan R. Snyder, Waterford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 826 days.

(21) Appl. No.: 11/743,945

(22) Filed: May 3, 2007

(65) Prior Publication Data
US 2008/0275611 A1 Nov. 6, 2008

(51) Int. Cl.
*B60K 6/00* (2007.10)
(52) U.S. Cl. .................... 701/51; 180/65.265
(58) Field of Classification Search .......... 701/51–56, 701/22; 180/65.21, 65.265, 65.275, 65.28, 180/65.285, 65.31
See application file for complete search history.

(56) References Cited

U.S. PATENT DOCUMENTS 5,708,216 A * 1/1998 Garshelis ............ 73/862.335
6,953,409 B2 10/2005 Schmidt et al.
7,586,083 B2 * 9/2009 Vahabzadeh et al. ........ 250/225
2008/0272717 A1 11/2008 Gleason et al.

* cited by examiner

*Primary Examiner*—Yonel Beaulieu

(57) ABSTRACT

A control system for a hybrid powertrain which determines engine crank angle position based upon signal inputs from electric machines of the powertrain is provided. The hybrid powertrain comprises an internal combustion engine and electric machines and an electro-mechanical transmission selectively operative to transmit torque therebetween. The electric machines are rotatably fixedly coupled to the internal combustion engine via a transmission input shaft. Control modules are adapted to execute a control scheme to determine engine crank angle position. The control scheme comprises code to determine an input shaft angle based upon rotational positions of the electric machines. An offset angle of the input shaft and an angular twist between the engine and the transmission are determined. An engine crank angle offset is determined based upon the offset angle and the angular twist of the input shaft.

19 Claims, 3 Drawing Sheets

METHOD AND APPARATUS TO DETERMINE ROTATIONAL POSITION OF AN INTERNAL COMBUSTION ENGINE

TECHNICAL FIELD

This invention pertains generally to control of a hybrid powertrain system, and more specifically to a control system to determine a rotational position of an internal combustion engine therefor.

BACKGROUND OF THE INVENTION

Vehicle propulsion systems comprising hybrid powertrains are known for managing the input and output torques of various torque-generative devices, most commonly internal combustion engines and electric machines. One hybrid powertrain architecture comprises a two-mode, compound-split, electromechanical transmission which utilizes an input member for receiving torque from a torque-generative source, e.g. an internal combustion engine, and an output member for delivering motive torque from the transmission to a vehicle driveline. The internal combustion engine and first and second electric machines and the electromechanical transmission are selectively operative to transmit torque therebetween. The first and second electric machines are mechanically coupled to the internal combustion engine via an input shaft.

During operation of the hybrid powertrain, the internal combustion engine can be selectively deactivated, including incidences whereat the engine is unfueled and the engine crankshaft does not rotate. Rotational angle of the crankshaft is important when the engine is subsequently restarted, in part to accurately predict torque variations caused by cylinder compression during engine cranking prior to firing the engine. This is important because magnitude of variations in engine crankshaft torque and cylinder compression can be greatest during a first rotation of the engine.

Control systems for electric machines typically include a feedback device such as a position sensor, e.g., a resolver, to provide data to measure position and rotational velocity. On an electric machine comprising a three-phase multi-pole synchronous electric machine, precise and accurate measurement of position of a rotor relative to each of the poles of a stator is important to achieve efficient transmission of electrical energy. Rotor position is typically measured using the resolver. Position of the resolver relative to the machine rotor is subject to error due to factors including manufacturing variations and tolerances. Correction of the resolver position error relative to the machine rotor is correctable, and a method for accomplishing this is disclosed in detail in commonly assigned U.S. patent application Ser. No. 11/743901 (Attorney Docket No. GP-308283) entitled "Method and apparatus to Determine Rotational Position of an Electrical Machine", which is incorporated herein by reference.

When using permanent-magnet synchronous machines, absolute position within one pole pair pitch is required. Also, the accuracy of this position measurement is critical, as it can affect the performance of the motor control, most noticeably in torque production and linearity. Using a resolver can provide precise position measurement. However, the accuracy of the measurement is directly affected by the initial alignment of the resolver during installation. The installation of the resolver and mechanical alignment can be difficult to control in production, and is typically addressed by employing a self-aligning start-up algorithm in the motor control. Furthermore, alignment of the resolver relative to the crankshaft of the attached internal combustion engine can be affected by initial installation of various components and by twisting occurring during operation.

There is a need to provide an improved method and system to precisely and accurately determine rotational angle of an engine crankshaft for use by a hybrid powertrain control system, to facilitate effective engine restart and for other reasons.

SUMMARY OF THE INVENTION

It is therefore an object of this invention to provide a control system for a hybrid powertrain which determines engine crank angle position based upon signal inputs from electric machines of the powertrain. The hybrid powertrain comprises an internal combustion engine and electric machines and an electromechanical transmission selectively operative to transmit torque therebetween. The electric machines are rotatably fixedly coupled to the internal combustion engine via a transmission input shaft and a gear set. Control modules are adapted to execute a control scheme to determine engine crank angle position. The control scheme comprises code to determine an input shaft angle based upon rotational positions of the electric machines. An offset angle of the input shaft and an angular twist between the engine and the transmission are determined. An engine crank angle offset is determined based upon the offset angle and the angular twist of the input shaft.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, embodiment of which is described in detail and illustrated in the accompanying drawings which form a part hereof, and wherein.

DETAILED DESCRIPTION OF AN EMBODIMENT OF THE INVENTION

Figure 1:
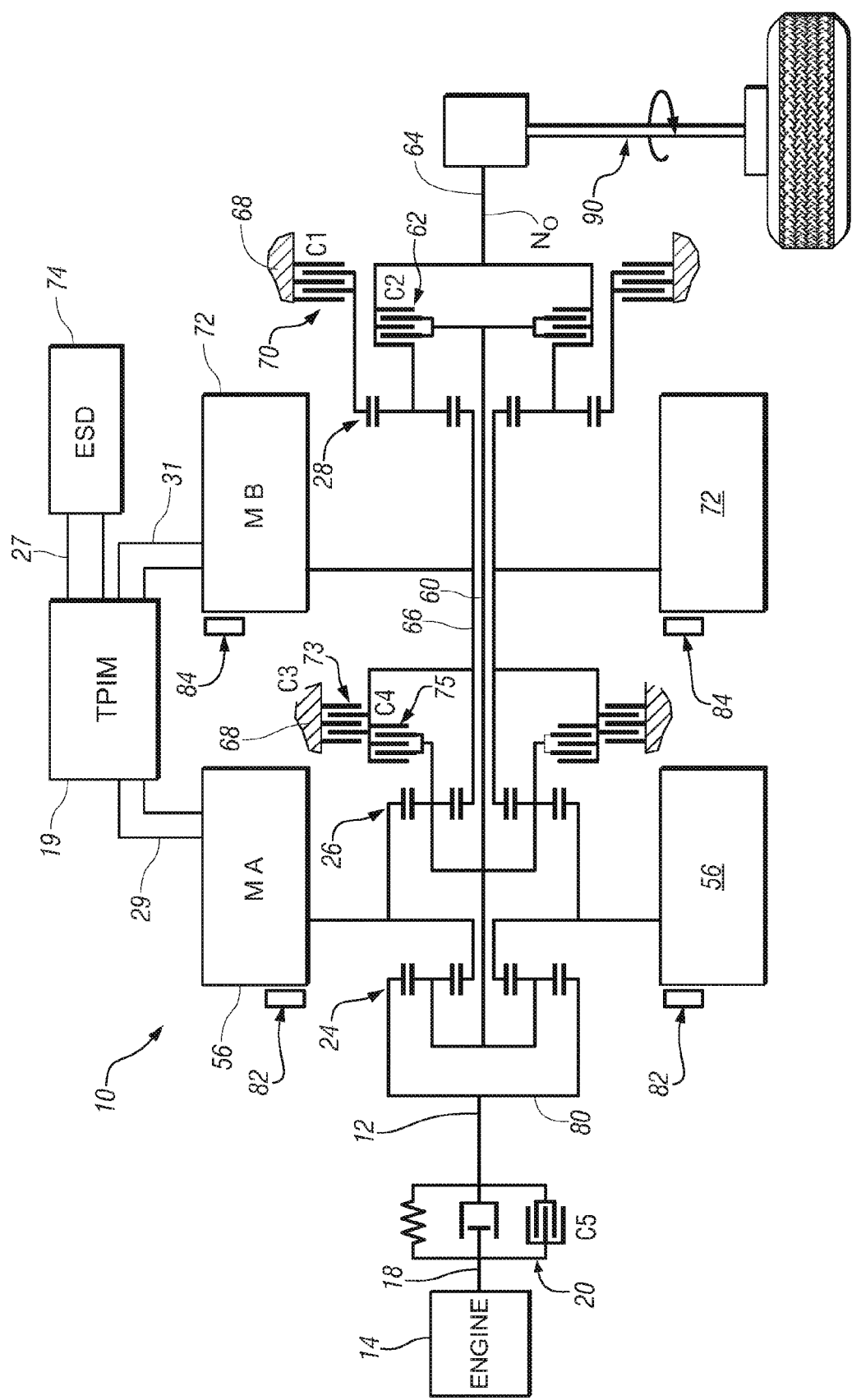
FIG. 1 is a schematic diagram of an exemplary powertrain, in accordance with the present invention; and, FIGS. 2 and 3 are schematic diagrams of an exemplary control architecture and powertrain, in accordance with the present invention.
Figure 2:
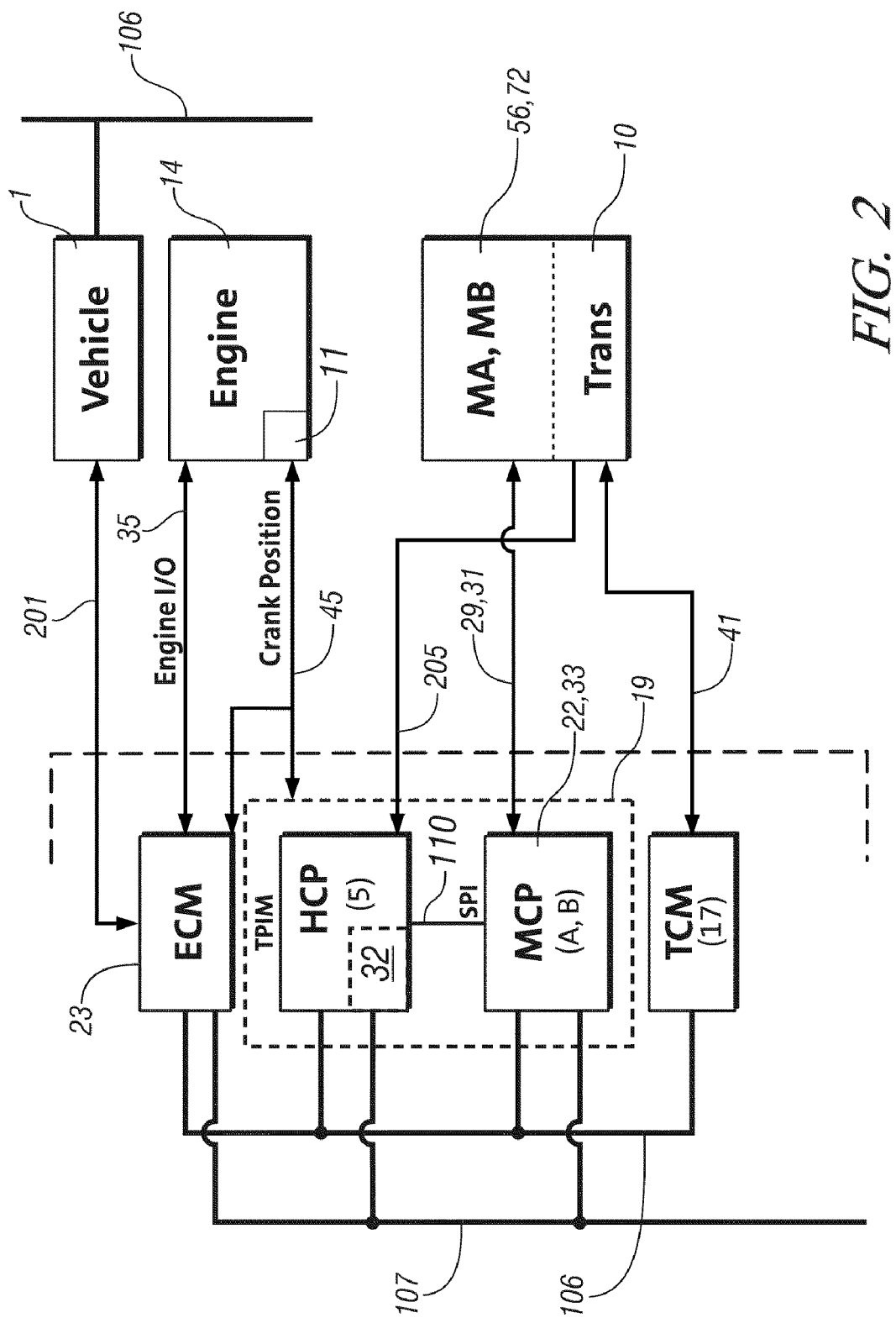
Figure 3:
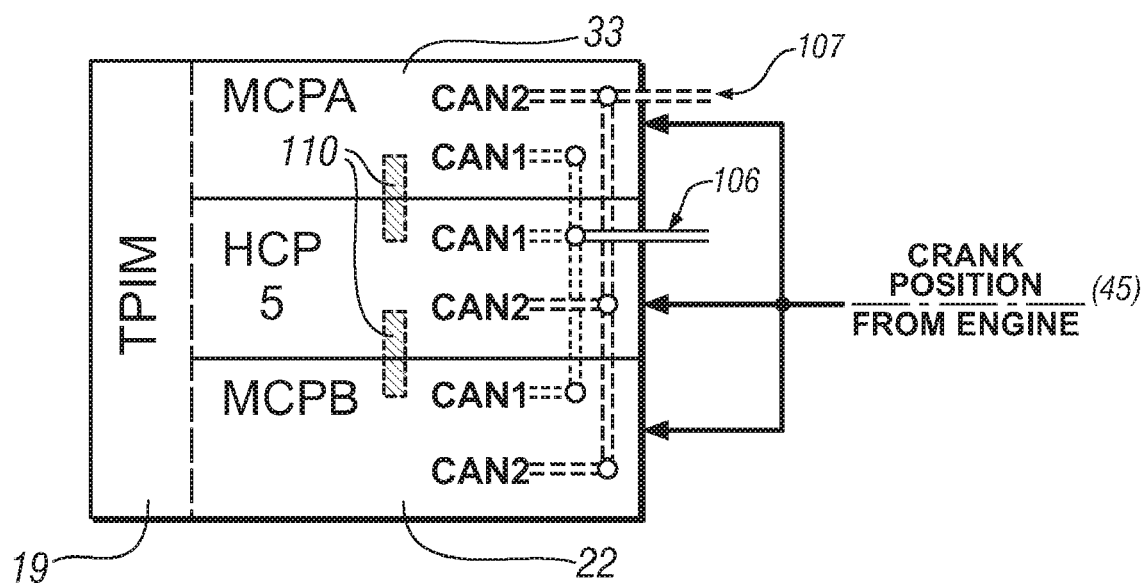

Referring now to the drawings, wherein the showings are for the purpose of illustrating the invention only and not for the purpose of limiting the same, FIGS. 1, 2, and 3 depict a schematic diagram of a hybrid powertrain system comprising an engine 14, an electromechanical transmission 10, control system, and driveline which has been constructed in accordance with an embodiment of the present invention. Mechanical aspects of exemplary transmission 10 are disclosed in detail in commonly assigned U.S. Pat. No. 6,953,409, entitled "Two-Mode, Compound-Split, Hybrid Electro-Mechanical Transmission having Four Fixed Ratios", which is incorporated herein by reference. The exemplary two-mode, compound-split, electromechanical hybrid transmission embodying the concepts of the present invention is depicted in FIG. 1, and is designated generally by the numeral 10. The transmission 10 includes an input shaft 12 characterized by an input rotational speed, $N_I$ and rotation angle $\theta_I$, and is preferably driven by the internal combustion engine 14. The engine 14 has a crankshaft operatively connected to a lockable torque damper device 20 operative to transmit torque to the transmission input shaft 12. The lockable torque damper device 20 preferably includes a selectively actuable clutch C5 to lock the torque damper device 20, thus transmitting torque directly between the engine and the input shaft 12 of the transmission. The engine crankshaft rotation is characterized by speed, rotation angle $\theta_E$ and an output torque. Engine crankshaft rotation is typically monitored by a crankshaft position sensor 11 comprising a variable reluctance sensor or similar device. When the damper device 20 is locked, the engine speed and output torque are effectively equal to the transmission input speed and input torque, with any differences comprising twisting of the components.

The engine 14 may be any of numerous forms of internal combustion engines, such as a spark-ignition engine or a compression-ignition engine, readily adaptable to provide a torque output to the transmission 10 at a range of operating speeds, from idle, at or near 600 revolutions per minute (RPM), to over 6,000 RPM. Irrespective of the means by which the engine 14 is connected to the input member 12 of the transmission 10, the input member 12 is constantly coupled to electric machines MA 56 and MB 72 by way of shafts and mechanical gears of the transmission 10.

The transmission 10 employs three single planetary gear sets 24, 26 and 28, and four torque-transmitting devices, i.e., clutches C1 70, C2 62, C3 73, and C4 75, with the input shaft 12 connected to the first planetary gear set 24 via carrier 80. An electro-hydraulic control system, preferably controlled by transmission control module ('TCM') 17, actuates and deactivates the clutches. Clutches C2 and C4 preferably comprise hydraulically-actuated rotating friction clutches. Clutches C1 and C3 preferably comprise hydraulically-actuated stationary devices grounded to the transmission case 68. The first and second electric machines 56 and 72 (MA, MB) comprise motor/generator devices which are operatively connected to the transmission via the planetary gears. Transmission output shaft 64 is operably connected to a vehicle driveline 90 to provide motive output torque to vehicle wheels.

The transmission 10 receives input torque from the torque-generative devices, including the engine 14 and the MA 56 and MB 72, as a result of energy conversion from fuel or electrical potential stored in an electrical energy storage device (ESD) 74. The ESD 74 is high voltage DC-coupled to a transmission power inverter module ('TPIM') 19 via DC transfer conductors 27. The TPIM 19 is an element of the control system described hereinafter with regard to FIG. 2.

Electric machines MA 56 and MB 72 preferably comprise known permanent magnet synchronous motor/generator three-phase AC machines, each constructed of a multi-pole electric stator and a rotor device. Such machines are preferable for powertrain and vehicle applications because they exhibit high torque-to-inertia ratios, high efficiency, and high power density. Each machine has a rotor operable to rotate within a stator that is mounted on a case of the transmission. The motor stator for each machine is grounded to outer transmission housing 68, and includes a stator core with coiled electrical windings extending therefrom. The rotor for MA 56 is attached to output shaft 60 and rotates therewith. The rotor for MB 72 is attached to sleeve shaft hub 66.

Each of the machines 56, 72 includes a position sensing device, preferably comprising a resolver assembly 82, 84 to provide accurate and precise information regarding position of the machine rotor relative to the machine stator. Each motor resolver assembly 82, 84 is appropriately positioned and assembled on one of the electric machines. The resolver assemblies comprise known variable reluctance devices including the resolver stator operably connected to the machine stator, and a resolver rotor operably connected to the machine rotor. The resolver stator comprises a series of inductive coils, or poles, assembled thereon which receive an electrical excitation signal from a motor control processor (MCPA or MCPB), and a pair of sensing, or pickup, coils which provide an electrical signal output. The resolver rotor comprises a device having a plurality of lobes, or eccentricities, located on the outer circumference. In operation, the resolver rotor rotates with the motor rotor. The pickup coils are excited by the excitation signal and return a signal to the motor control processor at the same frequency as the excitation frequency and having a voltage level that is dependent upon the proximity of the lobed resolver rotor to the resolver stator. The resolvers 82, 84 operate by sensing relative position and motion of the resolver rotor rotating within the resolver stator. The control system interprets the signal returned through the resolver stator to determine rotor position, as is described herein. The variable reluctance device is one of several known technologies useable to determine position. The exemplary resolver assemblies 82, 84 for MA and MB measure electrical rotational angles $\theta_A$ and $\theta_B$ that range from 0-360° of electrical rotation for each pair of poles of the stators. In the system described, a 10-pole resolver system measures 360° of electrical rotation for each 720 of mechanical shaft rotation, which translates to five electrical degrees of rotation for each mechanical degree of rotation. Each resolver generates an excitation frequency and measures feedback from electric signals across the resolver, permitting each resolver to measure position substantially immediately from start of rotation, without a need to synchronize.

In a typical engine system using a 58X crank wheel and a variable reluctance sensor, there are six degrees of mechanical rotation for each discernible sensor signal output. Thus, in this embodiment each resolver has a measurement resolution thirty times greater than the crank sensing system. The engine system can be expected to rotate as much as one complete revolution to synchronize the sensor output to an engine top-dead-center ('TDC') location for a nominal first cylinder. Thus, resolution of angular rotation using a resolver device can provide substantially improved crank angle resolution, which can be effectively used during engine restart events.

Referring now to FIGS. 2 and 3, schematic block diagrams of the control system, comprising a control architecture that is distributed amongst a plurality of modules, is shown. The elements described hereinafter comprise a subset of overall vehicle control architecture, and provide coordinated system control of the powertrain system described herein. The control system synthesizes pertinent information and inputs, and executes algorithms to control various actuators to achieve control targets, including such parameters as fuel economy, emissions, performance, driveability, and protection of hardware. The exemplary architecture for the control system comprises an arrangement of devices and modules, and emphasizes communications links between the control devices and various components of the powertrain system and the vehicle system. The control system for the powertrain system preferably comprises the following control devices: engine control module ('ECM') 23, and a transmission control module ('TCM') 17. There are motor control modules 33, 22 for MA and MB ('MCPA', 'MCPB'). A hybrid control module ('HCP') 5 provides overarching control and coordination of the aforementioned control modules. The TPIM 19 preferably comprises a single control module device including the HCP 5, MCPA 33, and MCPB 22. Vehicle communications bus 106 provides a first communications link between ECM 23, HCP 5, MCPA 33, MCPB 22, TCM 17, as well as to vehicle 1. Hybrid communications bus 107 provides a second communications link between ECM 23, HCP 5, MCPA 33, and MCPB 22. The vehicle communications bus 106 of this embodiment comprises a first controller area network (CAN1) and the hybrid communications bus 107 comprises a second controller area network (CAN2).

The exemplary system includes direct electrical signal connection between various elements of the powertrain system and specific control devices to facilitate communication of information outside normal channels afforded by the vehicle bus 106 and the hybrid bus 107, preferably at a faster update rate. This facilitates improved system control. The ECM 23 is directly connected to the engine 14 via the plurality of discrete lines collectively shown as aggregate line 35. One of those lines is distinctly shown apart from aggregate line 35, comprising a wire cable that is a signal line 45 from the engine crankshaft position sensor 11. The signal line 45 from engine crank position sensor 11 is directly wired in parallel to the one of the control modules of TPIM 19, to provide direct signal information from crank position sensor 11 for improved system control. The ECM 23 is preferably further directly connected to the vehicle 1 via aggregate line 201 in order to communicate vehicle-related inputs including coolant temperature, coolant level, and a hood switch, and to effect control of one or more coolant flow pumps. The HCP is preferably further directly connected to the transmission 10 via aggregate line 205 to have redundant inputs from a gear selector (PRNDL) sensor.

The control module device of TPIM 19 preferably comprises a single integrated circuit which includes the processor devices for the HCP, MCPA, and MCPB. There is a first serial peripheral interface bus ('SPI') 110 between HCP and MCPA, and a second SPI bus 110 between MCPA and MCPB. Each SPI bus comprises a full-duplex synchronous serial data link permitting direct communication between the devices. The MCPA directly and individually communicates with the HCP and the MCPB via the first and second SPI buses 110, thus achieving high-speed communications between the devices without communications delays which occur via the vehicle bus 106 or the hybrid bus 107. In this embodiment, messages are typically sent from the HCP to the MCPA and MCPB over the vehicle bus 106 and the hybrid bus 107 each 6.25 millisecond loop. Furthermore, messages are sent between the HCP and MCPA and MCPB via the SPI buses. In the embodiment, there is a serial control interface (SCI) (not shown) which effects communication between the MCPA and the MCPB.

The typical SPI-bus comprises a 4-wire serial communications interface to provide a synchronous serial data link which supports a low/medium bandwidth (e.g., 1 megabaud) network connection amongst the control modules supporting the SPI. A synchronous clock shifts serial data into and out of microcontrollers of the control modules in blocks of 8 bits. The SPI bus is a master/slave interface, with the master driving a serial clock, and data being simultaneously transmitted and received in a full-duplexed protocol. In this application, the master comprises the HCP 5. Further specific details of SPI communications are known to a skilled practitioner and not discussed in detail herein.

The ECM 23 is operably connected to the engine 14, and functions to acquire data from a variety of sensors and control a variety of actuators of the engine 14 over a plurality of discrete lines collectively shown as aggregate line 35. Various inputs that are monitored by ECM 23 include engine coolant temperature, engine crankshaft speed, manifold pressure, ambient air temperature, and ambient pressure. Various actuators that are controlled by the ECM 23 include fuel injectors, ignition modules, and throttle control modules. The TCM 17 is operably connected to the transmission 10 and functions to acquire data from a variety of sensors and provide command signals to the transmission. The TCM 17 is preferably directly connected to the transmission 10 via a plurality of discrete lines collectively shown as aggregate line 41.

Each of the aforementioned control modules is preferably a general-purpose digital computer generally comprising a microprocessor or central processing unit, storage mediums comprising read only memory (ROM), random access memory (RAM), electrically programmable read only memory (EPROM), i.e., non-volatile memory, high speed clock, analog to digital (A/D) and digital to analog (D/A) circuitry, and input/output circuitry and devices (I/O) and appropriate signal conditioning and buffer circuitry. Each control module has a set of control algorithms, comprising resident program instructions and calibrations stored in ROM and executed to provide the respective functions of each computer. Algorithms for control and state estimation in each of the control modules are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

The invention comprises a control scheme 32 to determine engine crank angle during ongoing operation, an embodiment of which can be executed for operation in a powertrain system constructed in accordance with the above description. The exemplary powertrain includes the internal combustion engine, the electric machines, and the electro-mechanical transmission selectively operative to transmit torque therebetween. The electric machines are rotationally fixedly coupled to the internal combustion engine via the input shaft. Control modules are adapted to execute the control scheme 32 to determine an engine rotational angle ($\theta_E$) based upon inputs from the electric machines during vehicle and engine operation, which is correlated to engine crankshaft position and a piston position, typically a TDC position of the nominal first cylinder. The control scheme 32 preferably includes machine-executable algorithmic code and inter-control module communications. The algorithmic code is operational during engine cranking, starting and ongoing vehicle operation, typically including any time the vehicle is in a key-on mode. Engine angle data is stored in non-volatile memory of one of the control modules during engine-off and vehicle-off periods.

In operation, rotational positions of the first and second electric machines are determined based upon signal inputs from the resolvers typically measured in electric degrees of rotation. Rotational position, or angle, of the input shaft 12 is determined based upon the rotational positions of the first and second electric machines, i.e., $\theta_A$ and $\theta_B$. An offset of the input shaft angle ($\Delta\theta_E$) is determined based upon the angle of the input shaft 12, comprising a combination of $\theta_A$ and $\theta_B$. A form of the offset is stored in EPROM or other non-volatile memory for use during operation of the vehicle, including during ongoing vehicle operation and during vehicle shut-down events. An angular twist, $\theta_T$, occurring between the engine and the electric motors of the transmission is determined, comprising twisting of the input shaft 12 and the torque damper device 20. The angular twist, the input shaft angle and the offset of the input shaft angle are combined to provide a measure of the engine rotational angle $\theta_E$. This measure of the engine rotational angle $\theta_E$ can be determined the first time the control system executes the control scheme 32 during an engine restart or engine start event, typically within 300 microseconds of an engine start event. This is now described in greater detail.

The current engine rotation angle $\theta_{E,CURR}$ is determined by adding the offset $\Delta\theta_E$ to the engine rotational angle $\theta_E$, as shown in Eq. 1:

$$\theta_{E,CURR} = \theta_E + \Delta\theta_E; \qquad [1]$$

wherein the engine rotation angle $\theta_E$ comprises the most recently determined engine angle based upon a signal input from the crank sensor which is a hardwired input to the MCPA 33, as shown in FIG. 3. The engine rotational angle $\theta_E$ may have been determined at any time during operation, including an engine-off event and a vehicle shutdown event.

The offset angle $\Delta\theta_E$ is determined by combining the angular twist, $\theta_T$, of the input shaft 12 and $\Delta\theta_I$ which represents the change in rotational position of the input shaft, determined based upon angular positions of the electric machines, as shown in Eq. 2:

$$\Delta\theta_E = \theta_T + \Delta\theta_I, \qquad [2]$$

wherein $\Delta\theta I$ is determined in Eq. 3:

$$\Delta\theta I = \Delta\theta A * K1 + \Delta\theta B * K2. \qquad [3]$$

The factors K1 and K2 comprise multipliers determined based upon mechanical gear ratios of the planetary gears of the transmission device and the quantity of lobes of the resolvers. At appropriate points in execution of the above calculations, the electrical rotational angles $\theta_A$, $\theta_B$ are translated to engine crank mechanical angles based upon the resolver design.

The input shaft angle, $\theta_I$, is determined as shown in Eq. 4:

$$\theta_I = (\theta_A * K1) + C1 + (\theta_B * K2) + C2. \qquad [4]$$

A value C3 can be determined, using results of Eq. 4, as described in Eq. 5:

$$C3 = C1 + C2; \qquad [5]$$

The value C3 represents the angular offset between input shaft angle as measured by the resolvers, and the engine crank angle, and can be represented as described in Eq. 6:

$$C3 = \theta_E - \theta_T - \theta_I \qquad [6]$$

The value C3 is ongoingly determined during engine operation and saved to non-volatile memory for use during subsequent engine crank/start and restart events. The engine rotation angle $\theta_E$, is ongoingly measured by the crank sensor, and can be captured in the non-volatile memory for subsequent use upon engine shutdown at a point wherein engine crankshaft rotation stops. Therefore, at any time during operation of the vehicle and engine, the current engine rotation angle $\theta_{E,CURR}$ can be determined by Eq. 7:

$$\theta_{E,CURR} = C3 + \theta_T + \theta_I; \qquad [7]$$

as derived and calculated from engine twist and rotation of the electric machines MA and MB. This includes periods during which the engine is shutdown during ongoing vehicle operation, and after vehicle operation has been discontinued.

The design and layout of the control system, especially TPIM 19, provides operation of the system. The SPI buses 110 provide time-synchronized communications between the HCP and motor control modules MCPA and MCPB. The SCI interface effects communications between motor control modules MCPA and MCPB, including using SPI communications from the HCP to synchronize time and time stamps. Control module MPCB 22 measures input from resolver B 84 to determine $\theta_B$, which it communicates to MCPA 33, including a precise, synchronized time-stamp. The MPCA 33 measures input from resolver A 82 to determine $\theta_A$ and monitors the 58X signal input from the direct-wired crankshaft sensor 45 from which engine angle $\theta_E$ is derived. The MCPA compensates and corrects the time-stamp for $\theta_B$ based upon any communications delays. This includes adjustments for rotational speed and time delays in communication to the HCP 5, to accommodate latencies introduced by delays in measurement and communications. The time-corrected measurements for $\theta_A$, $\theta_B$, and the 58X signal input from the direct-wired crankshaft sensor 45 are communicated to the HCP 5, which executes the control scheme 32 to determine engine rotational angle ($\theta_E$) based upon inputs from the electric machines. The measurements of $\theta_A$ and $\theta_B$ are converted from electrical degrees to mechanical degrees of crankshaft rotation. The high-speed communications between the devices using the SPI buses serves to minimize measurement errors which occur in systems that rely only upon LAN communications systems between control modules.

The angular twist $\theta_T$ of the input shaft can be estimated based upon mechanical factors of the shaft and the engine and transmission and the spring rate of the torque damper device 20. Magnitude of the angular twist $\theta_T$ is preferably an application-specific precalibrated relationship between engine operating factors including the engine rotational speed and the input torque $T_I$ transmitted between the transmission and the engine.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Control system for a hybrid powertrain comprising an internal combustion engine and electric machines and an electro-mechanical transmission selectively operative to transmit torque therebetween the electric machines rotatably fixedly coupled to the internal combustion engine via a transmission input shaft and a plurality of control modules adapted to execute a control scheme to determine an engine crank angle position, the control scheme comprising:
  code to determine an input shaft angle based upon rotational positions of the electric machines;
  code to determine an offset angle of the input shaft;
  code to determine an angular twist between the engine and the transmission; and,
  code to determine an engine crank angle offset based upon the offset angle and the angular twist of the input shaft.

2. The control system of claim 1, wherein the control modules adapted to execute the control scheme further comprise: electric motor control modules and a hybrid control module adapted to: monitor signal inputs from electric motor position sensing devices, time-stamp the signal inputs, and, communicate the time-stamped signal inputs to determine the rotational positions of the electric machines.

3. The control system of claim 2, further comprising the electric motor control modules and the hybrid control module signally connected via serial peripheral interface devices.

4. The control system of claim 2, further comprising an engine crankshaft position sensor directly and signally connected to a one of the motor control modules and the hybrid control module via an electrical cable.

5. The control system of claim 4, further comprising code to determine the engine crank angle based upon a signal from the crankshaft position sensor and the engine crank angle offset.

6. The control system of claim 2, wherein the motor control modules adapted to time-stamp the signal inputs, and, communicate the time-stamped signal inputs to determine the rotational positions of the electric machines, comprises: the control scheme operative to compensate the signal inputs from the electric motor resolvers for timing delays.

7. The control system of claim 2, wherein the electric motor position sensing devices comprise resolvers each comprising a stator having a plurality of inductive coils fixedly attached to a stator of the electric machine and a lobed resolver rotor fixedly attached to a rotor of the electric machine.

8. The control system of claim 1, wherein the code to determine the input shaft angle based upon rotational positions of the electric machines further comprises: code to determine rotational positions of the electric machines based upon inputs from the resolvers, and, code to measure and convert the electric resolver angles to a mechanical shaft angle.

9. The control system of claim 1, wherein the code to determine the angular twist comprises a predetermined relationship based upon input speed and torque.

10. The control system of claim 1, wherein the hybrid powertrain further comprises a torque damper device operative to transmit torque between the engine and the transmission input shaft; and, the code to determine the angular twist comprises a predetermined calibration of the torque damper device based upon input speed and torque.

11. The control system of claim 1, further comprising the control module adapted to store the engine crank angle offset in a non-volatile memory device.

12. Control system for a hybrid powertrain comprising an internal combustion engine and first and second electric machines and an electro-mechanical transmission selectively operative to transmit torque therebetween the first and second electric machines rotatably fixedly coupled to the internal combustion engine via a transmission input shaft and a plurality of control modules adapted to execute a control scheme to determine a rotational position of the engine relative to an engine cylinder position, the control scheme comprising:
code to determine an input shaft angle based upon rotational positions of the first and second electric machines;
code to determine an offset angle of the input shaft;
code to determine an angular twist between the engine and the first and second electric motors;
code to determine an engine crank angle offset based upon the offset angle and the angular twist; and,
code to determine the engine crank angle based upon a signal from the crankshaft position sensor and the engine crank angle offset.

13. The control system of claim 12, wherein the hybrid powertrain further comprises a torque damper device operative to transmit torque between the engine and the transmission input shaft; and, the code to determine the angular twist comprises a predetermined calibration based upon input speed and torque.

14. Method for calculating a rotational position of an internal combustion engine operatively connected to a hybrid powertrain comprising electric machines and an electro-mechanical transmission selectively operative to transmit torque therebetween the electric machines rotatably fixedly coupled to the internal combustion engine via an input shaft, comprising:
determining rotational positions of the electric machines;
determining an input shaft angle based upon the rotational positions of the electric machines;
determining an angular offset of the input shaft angle;
determining an angular twist between the engine and the electric machines; and
calculating a current engine crank angle based upon the input shaft angle, the angular offset of the input shaft angle, and the angular twist between the engine and the electric machines.

15. The method of claim 14, further comprising: monitoring signal inputs from electric motor position sensing devices, and, communicating the signal inputs to determine the rotational positions of the electric machines.

16. The method of claim 15, further comprising compensating the signal inputs from the electric motor resolvers for timing delays.

17. The method of claim 14, further comprising determining rotational positions of the electric machines based upon signal inputs from resolvers operatively connected to the electric machines.

18. The method of claim 17, further comprising converting the electric resolver angles to a mechanical shaft angle.

19. The method of claim 14, further comprising storing the angular offset of the input shaft angle in a non-volatile memory device.

* * * * *